United States Patent
Haverkamp et al.

(10) Patent No.: US 11,970,146 B2
(45) Date of Patent: Apr. 30, 2024

(54) SECONDARY BRAKE SYSTEM OF A VEHICLE, AND METHOD FOR CONTROLLING IT

(71) Applicant: WABCO Europe BVBA, Brussels (BE)

(72) Inventors: Michael Haverkamp, Hannover (DE); Lars Volker, Seelze (DE)

(73) Assignee: ZF CV Systems Europe BV, Brussels (BE)

( * ) Notice: Subject to any disclaimer, the term of this patent is extended or adjusted under 35 U.S.C. 154(b) by 266 days.

(21) Appl. No.: 17/398,571

(22) Filed: Aug. 10, 2021

(65) Prior Publication Data
US 2022/0048488 A1 Feb. 17, 2022

(30) Foreign Application Priority Data

Aug. 11, 2020 (DE) .......................... 102020121082.5

(51) Int. Cl.
| | | |
|---|---|---|
| *B60T 13/68* | (2006.01) | |
| *B60T 15/14* | (2006.01) | |
| *B60T 17/22* | (2006.01) | |
| *B60T 15/02* | (2006.01) | |

(52) U.S. Cl.
CPC .......... *B60T 13/683* (2013.01); *B60T 13/686* (2013.01); *B60T 15/14* (2013.01); *B60T 17/221* (2013.01); *B60T 15/027* (2013.01); *B60T 15/028* (2013.01)

(58) Field of Classification Search
CPC ...... B60T 13/683; B60T 13/686; B60T 15/14; B60T 17/221; B60T 15/027; B60T 15/028; B60T 13/22; B60T 13/385; B60T 13/68
See application file for complete search history.

(56) References Cited

U.S. PATENT DOCUMENTS

| | | | |
|---|---|---|---|
| 6,312,060 B1 | 11/2001 | Lipscomb et al. | |
| 11,685,352 B2 * | 6/2023 | Harrison | B60T 7/20 |
| | | | 303/33 |
| 2001/0002767 A1 * | 6/2001 | Dieringer | B60T 8/442 |
| | | | 303/10 |
| 2015/0367827 A1 * | 12/2015 | Dix | B60T 13/662 |
| | | | 303/10 |

FOREIGN PATENT DOCUMENTS

| | | |
|---|---|---|
| DE | 102008007877 B3 | 11/2009 |
| DE | 102015114176 B3 | 7/2016 |
| DE | 102017007780 A1 | 2/2019 |
| KR | 20180103987 A  * | 9/2018 |
| WO | 2019068320 A1 | 4/2019 |

* cited by examiner

*Primary Examiner* — Hung Q Nguyen
(74) *Attorney, Agent, or Firm* — Dickinson Wright PLLC

(57) ABSTRACT

The invention relates to an electronically controllable secondary brake system (46), operated by pressure medium, useable as both as a parking brake system and an auxiliary brake system, with spring brake cylinders (68a, 68b) arranged on wheel brakes of at least one vehicle axle (8), with a directly or indirectly electronically controllable brake control valve (56). The brake force of the spring brake cylinder (68a, 68b) can be reduced by a feed of pressure medium and can be increased by a discharge of pressure medium, and with an electronic brake control unit (48) for controlling the brake control valve (56) dependent on the current value of a brake value signal (SBW). The brake control valve (56) is configured as a 3/3-way proportional valve with a pressure medium inlet, a pressure medium outlet, and a working connector, which is connected via a working line (60, 66) to the spring brake cylinders.

18 Claims, 5 Drawing Sheets

SECONDARY BRAKE SYSTEM OF A VEHICLE, AND METHOD FOR CONTROLLING IT

CROSS-REFERENCE TO RELATED APPLICATIONS

This application claims the benefit of German Patent Application No. 10 2020 121 082.5, filed on Aug. 11, 2020, the entire content of which is hereby incorporated by reference in its entirety.

FIELD

The invention relates to an electronically controllable secondary brake system, operated by a pressure medium, of a vehicle, for example of a utility vehicle, which secondary brake system can be used both as a parking brake system and as an auxiliary brake system.

BACKGROUND

Vehicles that are provided primarily for driving on paved roads or for use in agriculture and forestry, and therefore also for driving away from paved roads, often have a primary brake system that is operated by a pressure medium and a secondary brake system which can be operated independently of the primary brake system. The primary brake system is usually a service brake system which can be configured as a hydraulic brake system or as a compressed air brake system, and which usually has two brake circuits that are assigned wheel brake cylinders that can be actuated by way of the pressure medium. The wheel brake cylinders of the brake circuits are arranged on different vehicle axles; for example, the wheel brake cylinders of the first brake circuit are arranged on the front axle, and the wheel brake cylinders of the second brake circuit are arranged on the rear axle of the vehicle.

The secondary brake system can likewise be configured such that it is operated by a pressure medium, and can utilize hydraulic oil or compressed air as pressure medium. The secondary brake system usually comprises spring brake cylinders which are arranged on the wheel brakes of only one vehicle axle, and the brake force of which can be reduced by way of the feed of pressure medium and can be increased by way of the discharge of pressure medium. The secondary brake system can be utilized at least as a parking brake system, the spring brake cylinders being relieved completely of the pressure medium in order to engage the parking brake, and being loaded with the pressure medium at the maximum working pressure in order to release the parking brake. The secondary brake system can also be utilized, however, as an auxiliary brake system that is used to brake the vehicle in the case of a failure of the primary brake system or service brake system. To this end, a controllable brake control valve is required, by way of which a metered feed and discharge of pressure medium into and from the spring brake cylinders, and therefore graduated braking of the vehicle, is possible.

Because electronically controlled brake systems have considerable advantages in comparison with pressure-controlled brake systems, namely more precise control of the brake forces on the wheel brakes of the vehicle axles, a more rapid response behavior of the wheel brakes to a changed brake value signal, less apparatus complexity for the control device, and an easier adaptability of the control device to different vehicles and brake systems, secondary brake systems are also increasingly provided with electronic control devices. In the case of said secondary brake systems, the spring brake cylinders can be loaded with pressure medium in each case via a directly or indirectly electronically controllable brake control valve by way of a connection to a pressure medium source, and can be relieved of pressure medium by way of a connection to a pressure medium sink.

In the case of electronically controlled secondary brake systems, however, there is the possibility that the electric energy supply of an associated electronic brake control unit is interrupted, that the electronic brake value signal fails due to a malfunction, or that an electronic malfunction occurs inside or outside the brake control unit. In this case, it should be ensured that the current operating state of the secondary brake system is maintained. As a result, for example, it is to be prevented that the wheel brakes that are actuated by the spring brake cylinders are released in the parking brake function in the case of a parked vehicle and an engaged parking brake, or are actuated with a maximum brake force during driving independently of a possibly present brake value signal.

In the case of a parking brake device of a vehicle, which parking brake device is known from DE 10 2008 007 877 B3 and can also be utilized as an auxiliary brake system, the brake control valve is configured as a pressure-controlled relay valve, the spring brake cylinders being connected to the working connector of said relay valve. A safety valve is connected upstream of the control inlet of the relay valve, which safety valve is configured as a pressure-controlled 3/2-way switching valve with two inlets and one outlet. In the case of a pressurized control inlet, the safety valve connects the outlet to the first inlet and, in the case of a pressureless control inlet, connects the outlet to the second inlet. The outlet and the first inlet of the safety valve are connected via a select-low valve and subsequently via a select-high valve to the control inlets of the relay valve. A 3/2-way solenoid switching valve is connected in each case upstream of the two inlets of the safety valve, via which 3/2-way solenoid switching valves the respective inlet can be connected selectively to a pressure medium source or the surroundings. In the non-energized state, the first solenoid switching valve connects the associated first inlet of the safety valve to the pressure medium source, whereas, in the non-energized state, the second solenoid switching valve connects the associated second inlet of the safety valve to the surroundings. The feedback of the first inlet and the outlet of the safety valve to its control inlet ensures that the switching state of the safety valve and the control pressure that prevails at the control inlet of the relay valve do not change in the case of switched-off solenoid valves, and therefore the current operating state of the parking brake system is maintained.

DE 10 2015 114 176 B3 describes an electropneumatic parking brake system, in the case of which the brake control valve is likewise configured as a pressure-controlled relay valve, the spring brake cylinders being connected to the working connector of said relay valve. An inlet valve and an outlet valve which are configured in each case as a 2/2-way solenoid switching valve are connected upstream of the control inlet of the relay valve. In the non-energized state, the inlet valve is closed and, in the energized state, connects the control inlet of the relay valve to a supply line which is connected to a compressed air source. The outlet valve is likewise closed in the non-energized state, and, in the energized state, connects the control inlet of the relay valve to a ventilation outlet. The actuation of the inlet and the outlet valves takes place via an electronic control unit which is connected to a first electric energy supply. Via a switch which can be actuated by a driver, a second electric energy supply can be connected to the electronic control unit or, together with a separate switching apparatus, to the inlet and outlet valves. In the case of a failure of the first energy supply or in the case of the occurrence of an electronic malfunction, it is possible by way of the switching apparatus and/or the second energy supply that the spring brake cylinders can still be ventilated completely at least for the engagement of the parking brake.

Another electronically controllable parking brake system, in the case of which the brake control valve is configured as a pressure-controlled relay valve, is known from WO 2019/068320 A1. An electropneumatic control unit which has a proportional valve and an electronic control unit is connected upstream of the control inlet of the relay valve. A compressed air source which comprises a compressed air accumulator is connected to the supply inlet of the relay valve via a supply line with a check valve which shuts off in the direction of the compressed air source. A 3/2-way solenoid switching valve with two inlets and one outlet is connected upstream of an inlet of the electropneumatic control unit, which 3/2-way solenoid switching valve can be actuated by the electronic control unit. In the non-energized state, the outlet of the solenoid switching valve is connected to the first inlet which is connected to the supply line between the compressed air source and the check valve. In the energized state, the outlet of the solenoid switching valve is connected to the second inlet which is connected to the supply line between the check valve and the relay valve. In the case of a failure of the power supply for the electronic control unit or in the case of the occurrence of an electronic malfunction, the solenoid switching valve is switched over into its non-energized rest position or is held in the latter. In the case of a vehicle standstill and a switched-off compressed air supply, the compressed air accumulator can be ventilated by the driver by way of multiple depression of the brake pedal, which, in the relevant switching position of the solenoid switching valve, leads to the ventilation of the spring brake cylinders and therefore to the engagement of the parking brake.

In contrast, DE 10 2017 007 780 A1 discloses an electropneumatic parking brake module, in the case of which the brake control valve is configured as a pressure-controlled 3/2-way switching valve with a supply inlet, a working connector and a ventilation outlet. The spring brake cylinders are connected to the working connector of the brake control valve via a working line with a shut-off valve. A pilot valve which is configured as a bi-stable 3/2-way solenoid switching valve is connected upstream of the control inlet of the brake control valve. The pilot valve is provided for the aeration and ventilation of the control inlet of the brake control valve, and can be controlled by an electronic control unit. The shut-off valve is configured as a pressure-controlled 2/2-way switching valve which is open in the case of a pressureless control inlet and is closed in the case of a pressurized control inlet. A pilot valve which is configured as a 3/2-way solenoid switching valve is connected upstream of the control inlet of the shut-off valve. The pilot valve is provided for the aeration and ventilation of the control inlet of the shut-off valve, and can be controlled by the electronic control unit. The control inlet of the shut-off valve is aerated in the energized state of the pilot valve, and is ventilated in the non-energized state of the pilot valve. By way of pulsed opening and closing of the shut-off valve, a graduated aeration or ventilation of the spring brake cylinders is possible depending on the switching position of the brake control valve. In the case of a failure of the electric energy supply of the electronic control unit or in the case of the occurrence of an electronic malfunction, the brake control valve remains in its switching position, and the shut-off valve switches into its open position or remains in said open position. In the case of aerated spring brake cylinders, they can be ventilated, in the case of a switched-off compressed air supply, by the driver by way of multiple depression of the brake pedal, and the parking brake can therefore be engaged.

Relay valves are of complex construction, are accordingly expensive to produce, and are relatively susceptible to malfunctions. Moreover, the control devices of the known parking brake systems and the parking brake module described above have valve arrangements of comparatively complicated construction, and in part have a restricted functional range.

SUMMARY

The present disclosure is therefore based on the object of presenting an electronically controllable secondary brake system, operated by pressure medium, of a vehicle, such as a utility vehicle, which secondary brake system can be utilized in an unrestricted manner both as a parking brake system and as an auxiliary brake system, and the control device of which secondary brake system has a valve arrangement of relatively simple construction. Additionally, a method for controlling a secondary brake system of this type in various operating types in a manner which is dependent on the current value of a brake value signal is provided.

In one aspect, the secondary brake system has spring brake cylinders which are arranged on wheel brakes of at least one vehicle axle. In addition, a directly or indirectly electronically controllable brake control valve is present, by means of which the brake force of the spring brake cylinder can be reduced by way of a feed of pressure medium and can be increased by way of a discharge of pressure medium. Moreover, the secondary brake system has an electronic brake control unit for controlling the brake control valve in a manner which is dependent on the current value of a brake value signal. Moreover, the present disclosure provides a method for controlling a secondary brake system of this type in various operating modes in a manner which is dependent on the brake value signal.

Accordingly, the present disclosure relates to an electronically controllable secondary brake system, operated by pressure medium, of a vehicle, for example of a utility vehicle, which secondary brake system is operable as both as a parking brake system and as an auxiliary brake system. The secondary brake system includes spring brake cylinders which are arranged on wheel brakes of at least one vehicle axle. Moreover, the secondary brake system has a directly or indirectly electronically controllable brake control valve, by way of which the brake force of the spring brake cylinder is reducible by way of a feed of pressure medium and increasable by way of a discharge of pressure medium. In one aspect, additionally, an electronic brake control unit is provided for controlling the brake control valve in a manner that is dependent on the current value of a brake value signal.

In order to achieve the object relating to an apparatus, it is provided in the case of the secondary brake system that the brake control valve is configured as a 3/3-way proportional valve with a pressure medium inlet, a pressure medium outlet, and a working connector, it being possible for the working connector to be adjusted continuously between a connection to the pressure medium outlet and to the pressure medium inlet, that the pressure medium inlet is connected via a supply line to a pressure medium source, the pressure medium outlet is connected to a pressure medium sink, and the working connector is connected via a working line to the spring brake cylinders, and that a controllable check valve that shuts off in the direction of the brake control valve is arranged in the working line.

As a result of the configuration of the brake control valve as a proportional valve and the arrangement of a controllable (that is to say, it can be opened as required) check valve in the working line between the brake control valve and the spring brake cylinders, the valve arrangement according to the present disclosure for setting the working pressure in the spring brake cylinders has valves which are comparatively simple and can be produced inexpensively. These valves and components and their arrangement ensure the required functional scope, because any desired working pressure between the minimum working pressure given by way of the ambient pressure and the maximum working pressure given by way of the supply pressure which prevails in the supply line can be set at the working connector of the brake control valve.

If the brake force of the spring brake cylinders is to be reduced, pressure medium is conveyed from the supply line via the brake control valve, the working line, and the check valve which is arranged in the latter, counter to the shut-off direction thereof, into the spring brake cylinders and therefore the associated wheel brakes are released by way of an actuation of the brake control valve, which actuation corresponds to the currently present value of the brake value signal.

If, in contrast, the brake force of the spring brake cylinders is to be increased, pressure medium is conveyed from the spring brake cylinders via the working line, the check valve which is arranged in the latter, and the brake control valve into the pressure medium sink and therefore the associated wheel brakes are actuated to a more pronounced extent under the action of the spring force accumulator springs by way of an actuation of the brake control valve, which actuation corresponds to the current value of the brake value signal, and by way of the opening of the check valve. Therefore, the secondary brake system according to the invention can be utilized in an unrestricted manner both as a parking brake system and as an auxiliary brake system.

In one aspect, the brake control valve is preferably configured as a solenoid valve, the electromagnet of which can be actuated directly by the brake control unit via an electric control line, and the working connector of which brake control valve is connected to the pressure medium outlet in the non-energized state and is connected in an unthrottled manner to the pressure medium inlet in the maximum energized state. In the case of a failure of the electric energy supply of the electronic brake control unit or in the case of the occurrence of an electronic malfunction, the working connector of the brake control valve is therefore pressureless and is disconnected from the spring brake cylinders in the case of a non-opened check valve. The active working pressure is then enclosed in the spring brake cylinders, with the result that the current operating state of the secondary brake system is maintained.

The direct electric actuation of the brake control valve by the brake control unit has the advantage of rapid adjustment of the desired working pressure in the spring brake cylinders. One possible disadvantage of this embodiment, however, is that the brake control valve might have large opening cross sections for the rapid feed and discharge of the pressure medium into or out of the spring brake cylinders, which large opening cross sections would require a relatively large electromagnet and correspondingly high control currents of the brake control valve.

In order to avoid this possible disadvantage, alternatively, the brake control valve can also be of pressure-controlled configuration, the working connector of said brake control valve being connected to the pressure medium outlet in the case of a pressureless control inlet and being connected in an unthrottled manner to the pressure medium inlet in the case of a control inlet which is loaded with a maximum actuating pressure. In this case, the brake control valve is assigned a pilot valve which is configured as a proportional valve and by way of which the control inlet of the brake control valve can be connected in a graduated manner to a pressure medium source or a pressure medium sink. In the case of a pressureless control inlet, the working connector of the brake control valve is therefore pressureless and is disconnected from the spring brake cylinders in the case of a non-opened check valve. The active working pressure is then enclosed in the spring brake cylinders, with the result that the current operating state of the secondary brake system is maintained.

In one aspect, for it to be possible for the control inlet of the brake control valve to be loaded with any desired actuating pressure which lies between the ambient pressure and the supply pressure, the pilot valve is configured as a 3/3-way solenoid valve with a pressure medium inlet, a pressure medium outlet, and a control outlet, in the case of which pilot valve the pressure medium inlet is connected via a connector line to the supply line, the pressure medium outlet is connected to the pressure medium sink, and the control outlet is connected via a control line to the control inlet of the brake control valve, and in the case of which pilot valve the control outlet is connected to the pressure medium outlet in the non-energized state and is connected in an unthrottled manner to the pressure medium inlet in the maximum energized state. The electromagnet of the pilot valve can be actuated by the brake control unit via an electric control line.

As a result of this construction, the control inlet of the brake control valve is pressureless in the non-energized state of the pilot valve, and is loaded with the maximum control pressure given by way of the supply pressure in the maximum energized state of the pilot valve. On account of the pressure-controlled embodiment of the brake control valve, merely relatively low control currents are necessary in order to actuate the pilot valve that advantageously has comparatively small opening cross sections due to the low control volumetric flows.

In one aspect, the controllable check valve is preferably of pressure-controlled configuration and can be unlocked by way of pressurization of its control inlet. The check valve is then assigned a pilot valve, by way of which the control inlet of the check valve can be connected selectively to a pressure medium source or to a pressure medium sink.

The pilot valve that is assigned to the controllable check valve is configured as a 3/2-way solenoid switching valve with a pressure medium inlet, a pressure medium outlet, and a control outlet, in the case of which pilot valve the pressure medium inlet is connected via a connector line to the supply line, the pressure medium outlet is connected to the pressure medium sink, and the control outlet is connected to the control inlet of the check valve, and in the case of which pilot valve the control outlet of the pilot valve is connected to the pressure medium outlet in the non-energized state and is connected to the pressure medium inlet in the energized state. The electromagnet of the pilot valve can be actuated by the brake control unit via an electric control line.

In order to measure and monitor the working pressure which prevails in the spring brake cylinders, a pressure sensor is advantageously connected to the working line, which pressure sensor is connected to the brake control unit via an electric sensor line.

In order to simplify the assembly of the valves in the vehicle and in order to avoid connection errors, it is preferably provided that at least the brake control valve, the check valve, and the pilot valve or the pilot valves are combined structurally in a brake control module.

The brake control unit preferably has a data storage medium, in which characteristic curves which are valid for different operating types are stored for setting the working pressure in the spring brake cylinders in a manner which is dependent on a brake value signal. As a result of the storage of corresponding characteristic curves in the data storage medium of the electronic control unit, an adaptation of the controller to different vehicles or vehicle types and to different control valves and pressure medium lines is also possible in a simple way, in addition to the operation of the secondary brake system in different operating types.

The secondary brake system can be configured as a hydraulic brake system, the pressure medium source of which has an oil pump, a hydraulic pressure preparation device, and a hydraulic pressure accumulator, and the pressure medium sink of which is configured as at least one hydraulic collecting vessel.

The secondary brake system can also be configured as a compressed air brake system, the pressure medium source of which has a compressor, a pneumatic pressure preparation device, and a pneumatic pressure accumulator, and the pressure medium sink of which is formed by way of at least one ventilation outlet.

According to another aspect, a method is provided for controlling an electronically controllable secondary brake system, operated by pressure medium, of a vehicle is provided, which secondary brake system can be used both as a parking brake system and as an auxiliary brake system, the secondary brake system including: spring brake cylinders which are arranged on wheel brakes of at least one vehicle axle; a directly or indirectly electronically controllable brake control valve, by way of which the brake force of the spring brake cylinders can be reduced by way of a feed of pressure medium and can be increased by way of a discharge of pressure medium; and an electronic brake control unit with a data storage medium, which electronic brake control unit controls the brake control valve in a manner which is dependent on the current value of a brake value signal.

According to one aspect of the method, the working pressure pFSB in the spring brake cylinders is set in a manner which is dependent on the current value of the brake value signal SBW with an actuation of the brake control valve and of a controllable check valve that is arranged downstream of the brake control valve and shuts off in the direction of the brake control valve.

The brake value signal SBW represents the current brake request or the current brake requirement of the driver. The current value of the brake value signal SBW can be indicated as a covered actuating travel of an actuating element in relation to the maximum possible actuating travel in percent. A value of 0% of the brake value signal SBW then means a brake request which is not present, and a value of 100% of the brake value signal SBW means a maximum brake request. The brake value signal SBW can be generated in a manner known per se by way of a displacement sensor which is arranged on a foot brake valve of the vehicle and is connected via an electric sensor line to the brake control unit. Alternatively, the brake value signal SBW can also be generated by way of a pressure sensor that is connected to a brake line of a brake circuit of the primary brake system of the vehicle and is connected via an electric sensor line to the brake control unit.

Setting the working pressure pFSB is preferably brought about with utilization of characteristic curves A, B, C which are at least co-determined, for example, by vehicle manufacturers for different vehicle types, vehicle models, and different operating types of the secondary brake system. Said characteristic curves A, B, C are preferably stored in a data storage medium of the brake control unit, and can therefore represent quite different pressure reduction profiles.

The secondary brake system can be utilized in accordance with an additional brake function, in which the secondary brake system then assists the service brake system of the vehicle in a manner that then brakes the vehicle if values of a brake value signal are present which signal a brake request of the driver which is greater than that brake retardation of the vehicle that would be manageable solely by the service brake system alone. To this end, the working pressure pFSB in the spring brake cylinders is lowered along with rising values of the brake value signal SBW from a fixed initial value of the brake value signal SBW_start, starting from a maximum working pressure pFSB_max in the case of a minimum value of the brake value signal SBW as far as a predefined working pressure pFSB in the case of a maximum value of the brake value signal SBW. Here, the setting of the working pressure pFSB of the secondary brake system takes place in such a way that the additional brake action of the secondary brake system during the use of the additional brake function is inserted into the overall action of the vehicle brake system in a manner which feels harmonic to the vehicle driver.

Furthermore, in another aspect, the secondary brake system may be utilized in an auxiliary brake function, in which the brake activity of the service brake system is replaced completely by the brake activity of the secondary brake system. To this end, the working pressure pFSB of the secondary brake system is lowered along with a rising value of the brake value signal SBW, starting from a maximum working pressure pFSB_max in the case of a minimum value of the brake value signal SBW as far as a minimum working pressure pFSB in the case of a maximum value of the brake value signal SBW. Said minimum working pressure pFSB can be, for example, from 10% to 20% of said maximum working pressure pFSB_max, including the range limits. Said minimum working pressure pFSB is selected in such a way that a vehicle retardation or negative acceleration of at least 2.2 m/s2 is achieved by means of the secondary brake system.

The auxiliary brake function is utilized at a standstill of the vehicle and at a low vehicle speed, as a result of which a comparatively small amount of frictional heat is produced at the vehicle brakes. In addition, in the operating range of the vehicle, the expectation of the vehicle driver of the brake action of the secondary brake system during utilization of the auxiliary brake function is not particularly high.

In the case of the utilization of the additional brake function and/or the auxiliary brake function, the respective pressure reduction can have a profile which, as mentioned, also takes specifications of the vehicle manufacturer into consideration. These specifications for the desired pressure reduction profiles can apply to different vehicle types and different vehicle models and can take a respective desired brake behavior into consideration. The pressure reduction profiles can also take the determined overall weight of the vehicle into consideration. It can therefore be provided, for example, that, in the case of the utilization of the additional brake function and/or the auxiliary brake function, the working pressure pFSB of the secondary brake system is lowered along with an increasing value of the brake value signal SBW in a progressive manner, starting from a maximum working pressure pFSB_max in the case of a minimum value of the brake value signal SBW, as far as a minimum working pressure pFSB in the case of a maximum value of the brake value signal SBW. The change in the brake action is adapted to the customary behavior of a pressure-controlled primary brake system by way of a progressive profile of this type of the pressure reduction and the associated progressive increase of the brake force of the spring brake cylinders.

Finally, the secondary brake system can be utilized in an emergency brake function, in which the service brake system is replaced completely by the secondary brake system with regard to its brake function. A vehicle retardation or a negative acceleration of at least 2.2 m/s2 is also achieved in the case of this operating method. Since, in the case of utilization of the emergency brake function, the secondary brake system is operated as a single vehicle brake, namely as a service brake, it also has to be capable of braking the vehicle from a relatively high speed completely to a standstill. As a result, although pronounced wear and a comparatively large quantity of frictional heat are generated at the actuated wheel brakes of the vehicle, this is acceptable in this case because the intention is to manage an emergency situation.

In order to operate the secondary brake system in the emergency brake function, the working pressure pFSB of the secondary brake system is lowered along with an increasing value of the brake value signal, for example in a linear manner, starting from a maximum working pressure pFSB-_max in the case of a minimum value of the brake value signal SBW, up to a smallest possible working pressure pFSB in the case of a maximum value of the brake value signal SBW. Said smallest possible working pressure pFSB can be, for example, from 0% to 5% of said maximum working pressure pFSB_max, including the range limits. The negative slope of the linear characteristic curve can be adapted to the respective vehicle type, the respective vehicle model, and/or the current overall weight of the vehicle, and can also be graduated, for example, with different slope values.

Accordingly, it is apparent that the profile of the reduction of the working pressure pFSB of the secondary brake system can be selected freely per se, and is substantially dependent on the vehicle type and the vehicle model in which the apparatus according to the invention for controlling the secondary brake system is installed. Moreover, in the case of the software setting of the brake behavior and therefore of the depicted profile of the reduction of the working pressure pFSB of the secondary brake system, the brake behavior that is expected by the vehicle driver for the respective operating situation can be set in a freely programmable manner.

Both in the case of the utilization of the auxiliary brake function and in the case of the utilization of the emergency brake function, the secondary brake system alone generates the working pressure which is necessary for braking the vehicle. Since the emergency brake function is utilized in emergency situations, the wheel brakes of the vehicle are preferably designed merely for that brake loading which is to be expected at most during the utilization of the auxiliary brake function. As a result, furthermore, the use of comparatively small and inexpensive wheel brakes is also possible.

In another aspect, the working pressure pFSB of the secondary brake system may be lowered along with an increasing value of the brake value signal SBW, starting from a maximum working pressure pFSB_max in the case of a minimum value of the brake value signal SBW, as far as a minimum working pressure pFSB in the case of a maximum value of the brake value signal SBW, the profile of said working pressure reduction being at least co-determined in a manner that is dependent on that vehicle type, vehicle model, and/or vehicle overall weight, in which the method of the present disclosure is utilized.

BRIEF DESCRIPTION OF THE DRAWINGS

Selected exemplary aspects of the invention are explained below with the aid of the accompanying figures, in which.

DETAILED DESCRIPTION OF THE DRAWINGS

Two embodiments of a secondary brake system 46, 46' which are configured according to the present disclosure and a method for controlling a secondary brake system 46, 46' of this type will be described in the following text by way of example on the basis of a vehicle 2 which is provided for the use in agriculture and forestry.

Figure 1:
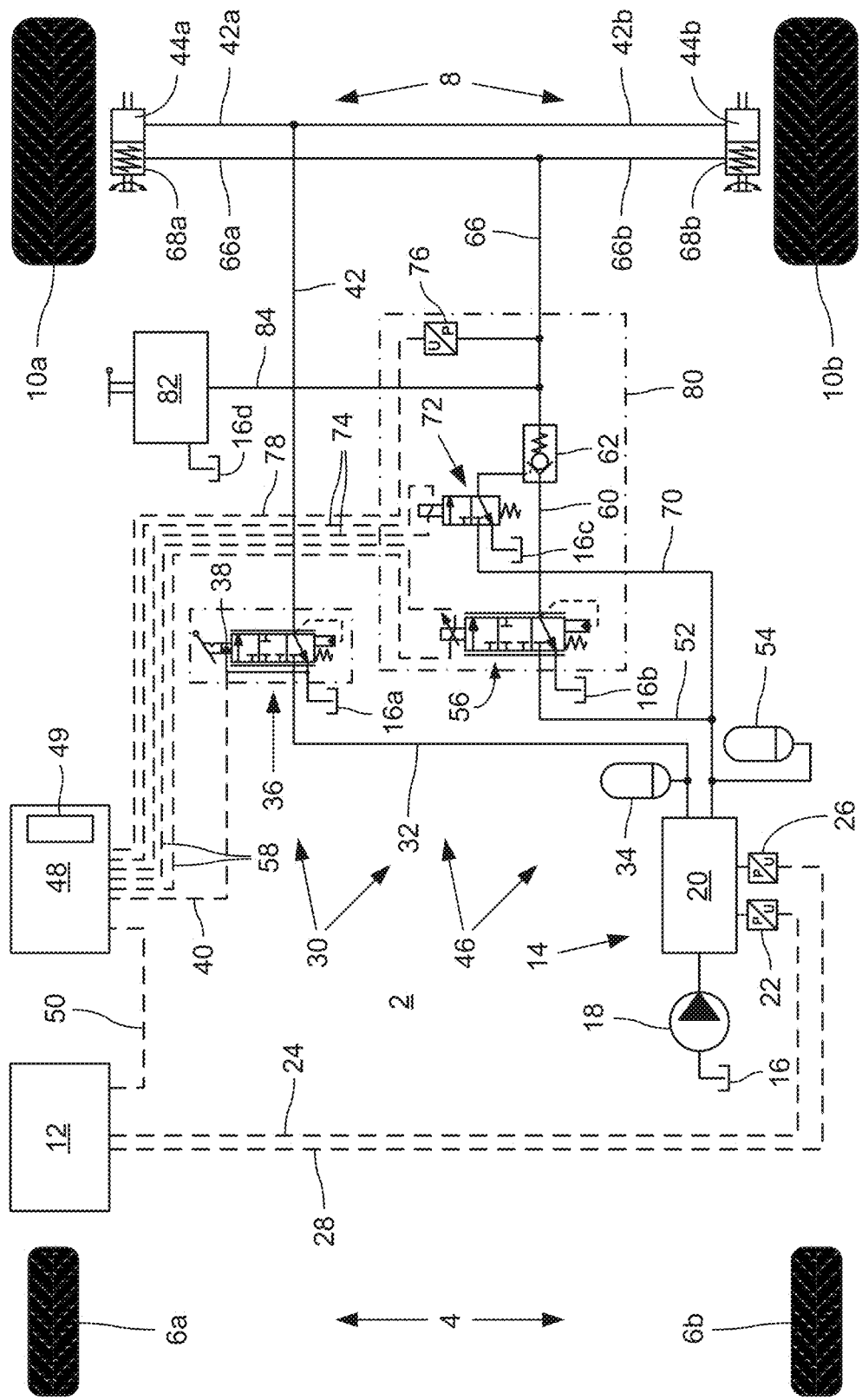
FIG. 1 is a first embodiment of a secondary brake system of a vehicle in a diagrammatic view, in accordance with an aspect of the disclosure.
Figure 3:
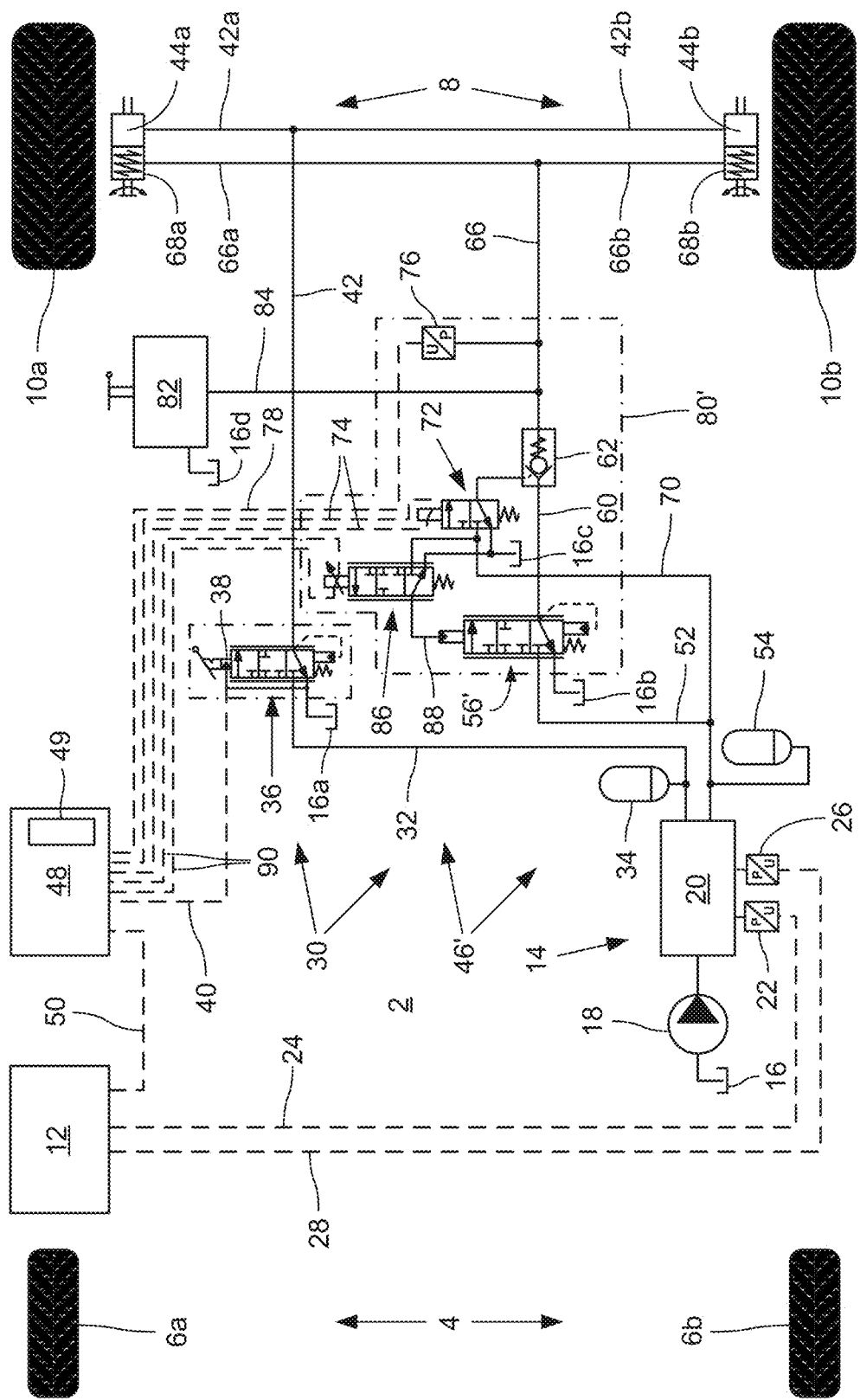
FIG. 3 is a second embodiment of a secondary brake system of a vehicle in a diagrammatic view, in accordance with an aspect of the disclosure.

The vehicle 2 that is depicted in each case diagrammatically in FIG. 1 and in FIG. 3 has a front axle 4 with two front wheels 6a, 6b that are arranged on the two sides of the vehicle 2 and a rear axle 8 with two rear wheels 10a, 10b that are likewise arranged on the two sides of the vehicle 2. The vehicle 2 is equipped with a hydraulic primary brake system 30 and with a hydraulic secondary brake system 46, 46'. A hydraulic pressure medium source 14 comprises an oil pump 18, by which hydraulic oil can be conveyed out of a hydraulic collecting vessel 16, and a hydraulic pressure medium preparation device 20, in which the conveyed hydraulic oil is cleaned, is cooled, and is conducted to two supply lines 32, 52. A hydraulic pressure sensor 22, 26 and a hydraulic pressure accumulator 34, 54 are connected in each case to the two supply lines 32, 52. The two pressure sensors 22, 26 are connected in each case via one electric sensor line 24, 28 to a central electronic control unit 12 of the vehicle 2.

The primary brake system 30 consists of a service brake system that in the present case includes, by way of example, only one brake circuit. The primary brake system or service brake system 30 includes the first supply line 32 with the associated first hydraulic pressure accumulator 34, a foot brake valve 36 that can be actuated mechanically by the driver via a brake pedal, a brake line 42 with two line branches 42*a*, 42*b*, and a service brake cylinder 44*a*, 44*b* which is connected in each case to one of said line branches 42*a*, 42*b*. The service brake cylinders 44*a*, 44*b* are arranged on the wheel brakes of the rear wheels 10*a*, 10*b*.

The foot brake valve 36 is configured as a 3/3-way proportional valve with a pressure medium inlet, a pressure medium outlet, and a brake pressure outlet. The abovementioned supply line 32 is connected to the pressure medium inlet. A pressureless hydraulic collecting vessel 16*a* is connected to the pressure medium outlet, and the brake line 42 is connected to the brake pressure outlet. By way of an axial displacement of a valve piston by way of the brake pedal on the foot brake valve 36, which valve piston is mounted such that it can be moved axially within the foot brake valve 36, the brake pressure that is active in the brake line 42 and therefore in the service brake cylinders 44*a*, 44*b* is adjusted continuously between a zero pressure (positive pressure=0 Pa) and a supply pressure which prevails by way of that pressure in the supply line 32. As a result, the brake force which acts via the service brake cylinders 44*a*, 44*b* on the wheel brakes of the rear wheels 10*a*, 10*b* is set.

By way of a displacement sensor 38 that is arranged on the foot brake valve 36, the covered actuating travel of the valve piston of the foot brake valve 36 is detected, and is transmitted via an electric sensor line 40 to an electronic brake control unit 48, in which a brake value signal SBW or the current value thereof is formed from the actuating travel signal. The brake value signal SBW reflects the brake request of the driver, and can assume any desired value between 0% for a non-existent brake request and 100% for a maximum brake request. The brake control unit 48 is connected via a data bus 50, such as, for example, a CAN bus, to the central control unit 12 of the vehicle 2.

The secondary brake system 46, 46' comprises the second supply line 52 with the associated second hydraulic pressure accumulator 54, a brake control valve 56, 56', an in-let-side working line 60, a controllable check valve 62 with an associated pilot valve 72, an out-let-side working line 66 with two line branches 66*a*, 66*b*, and a spring brake cylinder 68*a*, 68*b* which is connected in each case to one of said two line branches 66*a*, 66*b*. The two spring brake cylinders 68*a*, 68*b* are arranged on the wheel brakes of the two rear wheels 10*a*, 10*b*, and are of combined configuration with the service brake cylinders 44*a*, 44*b*.

The abovementioned brake control valve 56, 56' is configured as a 3/3-way proportional valve with a pressure medium inlet, a pressure medium outlet, and a working connector, via which brake control valve 56, 56' the working connector can be adjusted continuously between a connection to the pressure medium outlet and the pressure medium inlet. The pressure medium inlet is connected via the first supply line 52 to the hydraulic pressure medium source 14, the pressure medium outlet is connected to a pressureless hydraulic collecting vessel 16*b*, and the working connector is connected via the two working lines 60, 66 to the two spring brake cylinders 68*a*, 68*b*. The controllable check valve 62 is arranged in the inlet-side working line 60 so as to shut off in the direction of the brake control valve 56, 56'.

Figure 2:
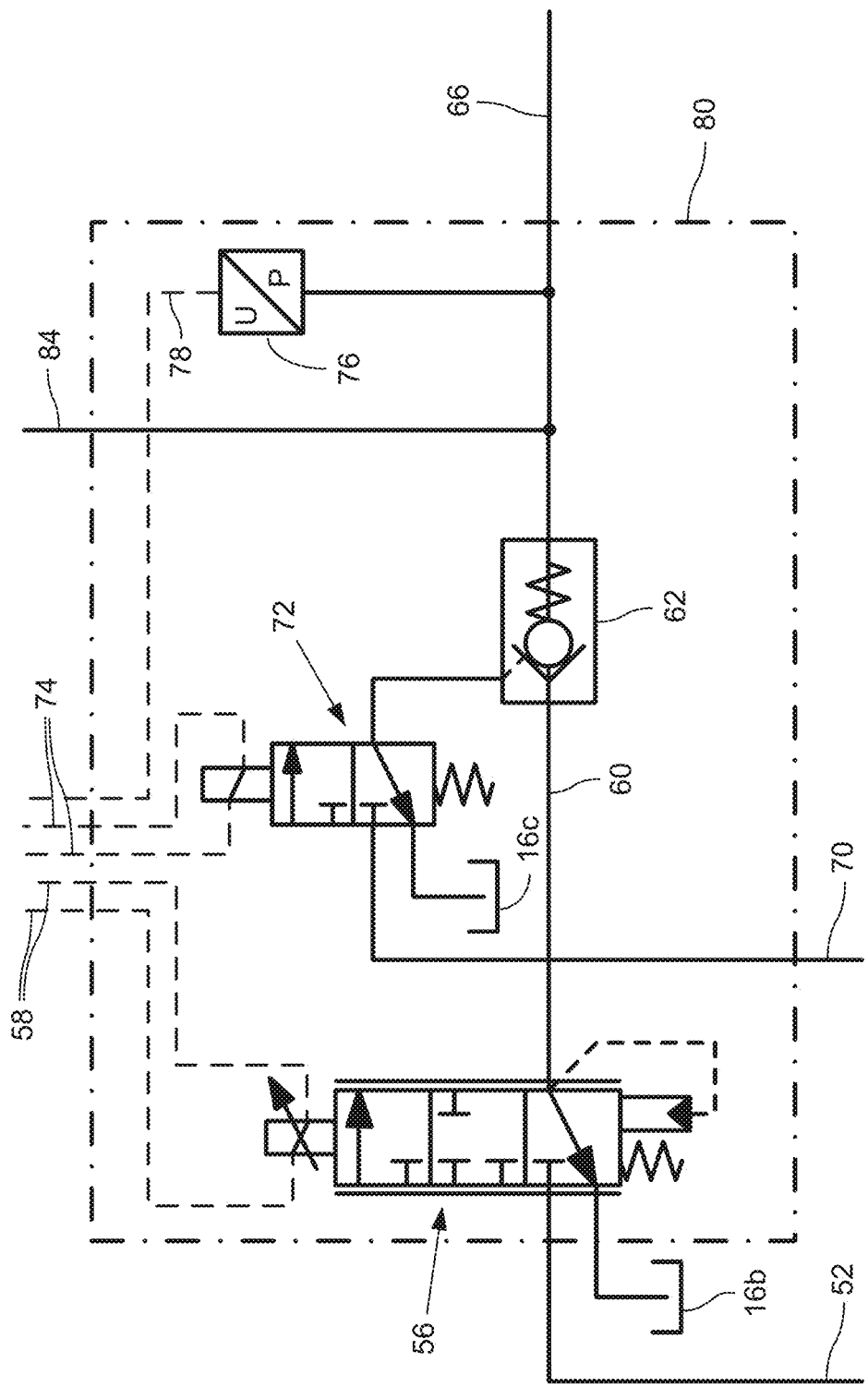
FIG. 2 is an enlarged view of a valve arrangement for controlling the secondary brake system according to FIG. 1, according to an aspect of the disclosure.

As is also apparent from that detail from FIG. 1, which is depicted on an increased scale in FIG. 2, the brake control valve 56 in accordance with the first embodiment which is shown of the secondary brake system 46 is configured as a solenoid valve, the electromagnet of which can be actuated directly by the brake control unit 48 via an electric control line 58. The working connector of the brake control valve 56 is connected to the pressure medium outlet in the non-energized state, and is connected in an unthrottled manner to the pressure medium inlet in the maximum energized state.

Figure 4:
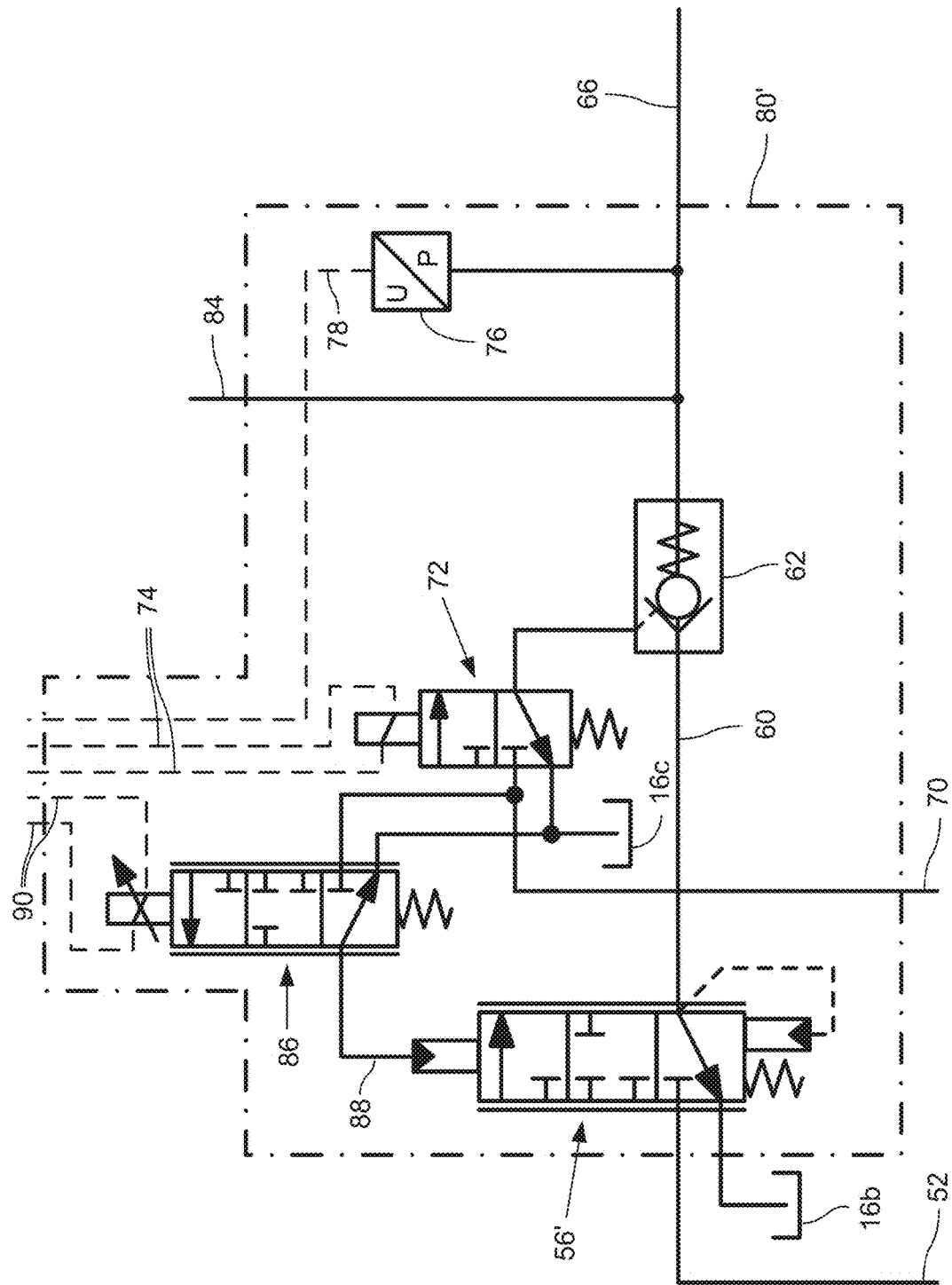
FIG. 4 is an enlarged view of a valve arrangement for controlling the secondary brake system according to FIG. 2, in accordance with an aspect of the disclosure.

As is also apparent from that detail from FIG. 3, which is depicted on an increased scale in FIG. 4, the brake control valve 56' in accordance with the second embodiment of the secondary brake system 46' is of pressure-controlled configuration. The working connector of said pressure-controlled brake control valve 56' is connected to the pressure medium outlet in the case of a pressureless control inlet, and is connected in an unthrottled manner to the pressure medium inlet in the case of a control inlet which is loaded with a maximum actuating pressure. The pressure-controlled brake control valve 56' is assigned a pilot valve 86 which is configured as a proportional valve and via which the control inlet of the pressure-controlled brake control valve 56' can be connected in a graduated manner to the pressure medium source 14 or a pressureless hydraulic collecting vessel 16*c*.

The pilot valve 86 that is assigned to the pressure-controlled brake control valve 56' is configured as a 3/3-way solenoid valve with a pressure medium inlet, a pressure medium outlet, and a control outlet. The pressure medium inlet is connected via a connector line 70 to the supply line 52, the pressure medium outlet is connected to the collecting vessel 16*c*, and the control outlet is connected via a control line 88 to the control inlet of the pressure-controlled brake control valve 56'. The control outlet of said pilot valve 86 is connected to the pressure medium outlet in the non-energized state, and is connected in an unthrottled manner to the pressure medium inlet in the maximum energized state. The electromagnet of the pilot valve 86 can be controlled by means of the brake control unit 48 via an electric control line 90.

The controllable check valve 62 is of pressure-controlled configuration, and can be opened by way of pressurization of its control inlet. Via the pilot valve 72 that is assigned to the check valve 62, the control inlet of the check valve 62 can be connected selectively to the pressure medium source 14 or a pressureless hydraulic collecting vessel 16*c*. The pilot valve 72 is configured as a 3/2-way solenoid switching valve with a pressure medium inlet, a pressure medium outlet, and a control outlet. The pressure medium inlet is connected via a connector line 70 to the supply line 52, the pressure medium outlet is connected to the collecting vessel 16*c*, and the control outlet of the pilot valve 72 is connected to the control inlet of the check valve 62. The control outlet of the pilot valve 72 is connected to the pressure medium outlet in the non-energized state, and is connected to the pressure medium inlet of the pilot valve 72 in the energized state. The electromagnet of the pilot valve 72 can be actuated by the brake control unit 48 via an electric control line 74.

The inlet-side working line 60 is connected to the outlet-side working line 66 via the controllable check valve 62. A hand pump 82 is connected via a pressure line 84 to the out-let-side working line 66, by way of which hand pump 82 hydraulic oil can be conveyed manually out of a pressureless hydraulic collecting vessel 16*d* into the spring brake cylinders 68*a*, 68*b*. The hand pump 82 has a check valve (not shown), with the result that unintentional ventilation via the hand pump is ruled out. By means of the hand pump 82, the parking brake which is engaged via the pressureless spring brake cylinders 68*a*, 68*b* can be released, for example in order to make it possible for the vehicle 2 to be towed if this is not possible in another way on account of a defect.

The hydraulic collecting vessels 16, 16*a*, 16*b*, 16*c*, 16*d* which are depicted in each case separately in FIGS. 1 and 3 can be a single collecting vessel, into which in each case a suction or return line is guided.

In order to detect and monitor the working pressure which prevails in the spring brake cylinders 68a, 68b, an electro-hydraulic pressure sensor 76 is connected to the outlet-side working line 66, which pressure sensor 76 is connected via an electric sensor line 78 to the brake control unit 48.

In the first embodiment of the secondary brake system 46 according to FIGS. 1 and 2, the brake control valve 56, the controllable check valve 62 with the associated pilot valve 72, and the pressure sensor 76 are combined structurally in a brake control module 80. In the second embodiment of the secondary brake system 46' according to FIGS. 2 and 4, in a similar way, the brake control valve 56' with the associated pilot valve 86, the controllable check valve 62 with the associated pilot valve 72, and the pressure sensor 76 are combined structurally in a brake control module 80'. As a result of the combination of said valves 56, 62, 72; 56', 86, 62, 72 and the pressure sensor 76 in a brake control module 80, 80', their assembly in the vehicle 2 is simplified and connection errors are avoided.

In the case of the two embodiments of the secondary brake system 46, 46' according to the present disclosure, the working pressure pFSB which is active in the wheel brake cylinders 68a, 68b can be set continuously between the ambient pressure and the maximum working pressure pFSB_ max which is formed by way of the supply pressure pV which prevails in the supply line 52 by way of a corresponding direct or indirect actuation of the respective brake control valve 56, 56' by the electronic brake control unit 48. Here, the controllable check valve 62 remains non-actuated in the case of an increase of the working pressure pFSB, but has to be opened by way of a switchover of the associated pilot valve 72 in the case of a reduction of the working pressure pFSB.

The configuration of the brake control valve 56 as a solenoid valve in the first embodiment of the secondary brake system 46 according to FIGS. 1 and 2 has the advantage, on account of the direct actuation by the brake control unit 48, of high control dynamics, but it requires a comparatively large electromagnet and correspondingly high control currents to manage the high volumetric flows of the pressure medium on account of the large opening cross sections.

The configuration of the brake control valve 56' as a pressure-controlled proportional valve in the second embodiment of the secondary brake system 46' according to FIGS. 3 and 4 has the advantage of lower control currents on account of the indirect actuation via the pilot valve 86, but, as a result, it has lesser control dynamics and a higher apparatus complexity as a result of the additional pilot valve 86.

In the case of the two embodiments of the secondary brake system 46, 46', it is ensured in the case of a failure of the electric energy supply of the electronic brake control unit 48 or in the case of the occurrence of an electronic malfunction that the working connector of the brake control valve 56, 56' is then pressureless and, in the case of an unopened check valve 62, is disconnected from the spring brake cylinders 68a, 68b on the rear axle 8. The active working pressure pFSB is then enclosed in the spring brake cylinders 68a, 68b, with the result that the current operating state of the secondary brake system 46, 46' is maintained. The secondary brake system 46, 46' according to the invention can therefore be utilized in an unrestricted manner both as a parking brake system and as an auxiliary brake system.

A further advantage of the secondary brake system 46, 46' according to the invention results from the fact that the working pressure pFSB in the spring brake cylinders 68a, 68b can be set in a manner which is dependent on a determined brake value signal SBW in the case of actuation of the brake control valve 56, 56' and of the controllable check valve 62 which is connected downstream of it, on the basis of characteristic curves which apply in each case for different operating types of the secondary brake system 68a, 68b. These characteristic curves are adapted to the respective vehicle 2 and to the components which are used of the secondary brake system 46, 46', and are stored in a data storage medium 49 which is assigned to the brake control unit 48 or is arranged there.

Figure 5:
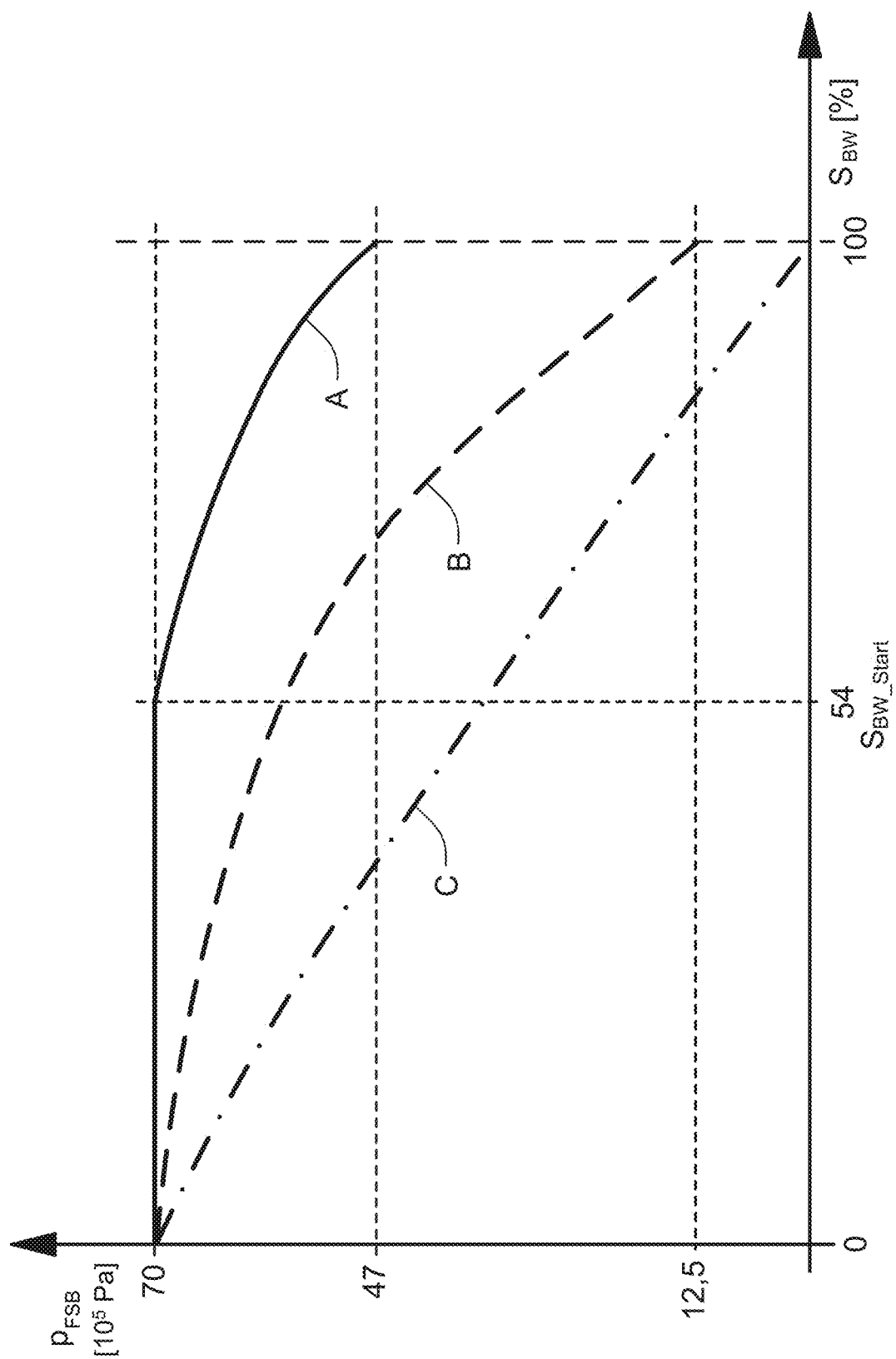
FIG. 5 illustrates a plurality of characteristic curves that are valid for different operating types of the secondary brake system according to FIG. 1 and FIG. 3, in accordance with an aspect of the disclosure.

In the diagram that is depicted in FIG. 5, three characteristic curves A, B, C are illustrated by way of example, which characteristic curves A, B, C show the operating pressure pFSB which is to be adjusted in the spring brake cylinders 68a, 68b in a manner which is dependent on the current value of the brake value signal SBW for different operating types of the secondary brake system 46, 46'. The curve profiles of the three characteristic curves A, B, C can also be different in detail than what is shown, but they always characterize a reduction of the operating pressure pFSB of the secondary brake system 46, 46' in a manner which is dependent on the brake value signal SBW.

The brake value signal SBW can have been determined, for example, by way of the actuating travel signal of the displacement sensor 38 which is arranged on the foot brake valve 36. The current value of the brake value signal SBW indicates the current brake request or the vehicle retardation desire of the driver, a value of SBW=0% meaning a non-existing brake request, and a value of SBW=100% meaning a maximum brake request of the driver.

The first characteristic curve A applies to an additional brake function of the secondary brake system 46, 46', in which the service brake system 30 is assisted in braking manner by the secondary brake system 46, 46' in the case of relatively high values of the brake value signal (here, for example, from the initial value SBW_start≥54%). In a manner which corresponds to said first characteristic curve A, it is accordingly provided that, starting from a maximum working pressure of in the present case pFSB_max=70×105 Pa in the case of a value of the brake value signal of SBW=0%, the working pressure pFSB is lowered from the previously determined initial value of SBW_start=54% with an increasing value of the brake value signal SBW, in a progressive manner up to a working pressure of pFSB=47× 105 Pa here in the case of a value of 100% of the brake value signal SBW. As a result of the progressive profile of the pressure reduction and the associated progressive increase of the brake force of the spring brake cylinders 68a, 68b, the change of the brake action is adapted to the customary behavior of a pressure-controlled primary brake system.

The second characteristic curve B applies to an auxiliary brake function of the secondary brake system 46, 46', in which the brake action of the service brake system 30 is replaced by the brake action of the secondary brake system 46, 46'. In a manner which corresponds to said second characteristic curve B, it is provided that the working pressure pFSB, starting from a maximum working pressure of in the present case pFSB_max=70×105 Pa in the case of a value of the brake value signal SBW=0%, is lowered, with a rising value of the brake value signal SBW, in a progressive manner as far as a minimum working pressure pFSB of pFSB=12.5×105 Pa in the case of a brake value signal of SBW=100%. Here, the change of the brake action is also adapted to the customary behavior of a pressure-controlled primary brake system as a result of the progressive profile of the pressure reduction and the associated progressive increase of the brake force of the spring brake cylinders 68a, 68b.

The third characteristic curve C applies to an emergency brake function of the secondary brake system 46, 46', in which the service brake system 30 is replaced completely by the secondary brake system 46, 46' with regard to its brake function. In a manner which corresponds to said third characteristic curve C, it is provided that, starting from a maximum working pressure of in the present case pFSB_max=70×105 Pa in the case of a value of the brake value signal of SBW=0%, the working pressure pFSB is lowered at least largely in a linear manner, with a rising value of the brake value signal, to a working pressure of pFSB=0 Pa in the case of a value of the brake value signal of SBW=100%. An increase of the brake action which is as rapid as possible is achieved as a result of the linear profile of the pressure reduction and the associated linear increase of the brake force of the spring brake cylinders 68a, 68b.

While the above description constitutes the preferred embodiments of the present invention, it will be appreciated that the invention is susceptible to modification, variation and change without departing from the proper scope and fair meaning of the accompanying claims.

What is claimed is:

1. An electronically controllable secondary brake system (46, 46') of a vehicle (2), the secondary brake system operable as both a parking brake system and an auxiliary brake system, the secondary brake system operated by pressure medium and comprising:
   spring brake cylinders (68a, 68b) arranged on wheel brakes of at least one vehicle axle (8);
   a directly or indirectly electronically controllable brake control valve (56, 56'), an electronic brake control unit (48) that controls the brake control valve (56, 56') in a manner that is dependent on the current value of a brake value signal (SBW),
   wherein the brake control valve is a 3/3-way proportional valve with a pressure medium inlet, a pressure medium outlet, and a working connector,
   wherein the working connector is adjustable continuously between a connection to the pressure medium outlet and to the pressure medium inlet,
   wherein the pressure medium inlet is connected via a supply line (52) to a pressure medium source (14),
   wherein the pressure medium outlet is connected to a pressure medium sink (16b), and
   wherein the working connector is connected via a working line (60, 66) to the spring brake cylinders (68a, 68b),
   wherein a controllable check valve (62), which shuts off in the direction of the brake control valve (56, 56'), is arranged in the working line (60)
   wherein brake force of the spring brake cylinder (68a, 68b) is reduced by the brake control valve (56, 56') by way of a feed of pressure medium and
   wherein the brake force of the spring brake cylinder (68a, 68b) is increased by the brake control valve (56, 56') by way of a discharge of pressure medium,
   wherein the brake control valve (56) is a solenoid valve, an electromagnet of which is actuated directly by the brake control unit (48) via an electric control line (58), and wherein the working connector of said brake control valve (56) is connected to the pressure medium outlet in the non-energized state and is connected in an unthrottled manner to the pressure medium inlet in the maximum energized state.

2. The secondary brake system (46, 46') as claimed in claim 1, wherein a pressure sensor (76) is connected to the working line (66), and is connected to the brake control unit (48) via an electric sensor line (78).

3. The secondary brake system (46, 46') as claimed in claim 1, wherein at least the brake control valve (56, 56'), the check valve (62), and the pilot valve (72, 86) are combined structurally in a brake control module (80, 80').

4. The secondary brake system (46, 46') as claimed in claim 1, wherein the brake control unit (48) has a data storage medium (49), in which characteristic curves (A, B, C) that are valid for different operating types are stored for setting a working pressure (pFSB) in the spring brake cylinders (68a, 68b) in a manner that is dependent on a brake value signal (SBW).

5. The secondary brake system (46) as claimed in claim 1, wherein the brake force of the spring brake cylinder (68a, 68b) is maintained in response to a failure of an electric energy supply of the electronic brake control unit (48) or an occurrence of an electronic malfunction, wherein the working connector of the brake control valve (56, 56') is pressureless, the check valve (62) is unopened, and the brake control valve (56, 56') is disconnected from the spring brake cylinders (68a, 68b), wherein a working pressure pFSB is enclosed in the spring brake cylinders (68a, 68b).

6. An electronically controllable secondary brake system (46, 46') of a vehicle (2), the secondary brake system operable as both a parking brake system and an auxiliary brake system, the secondary brake system operated by pressure medium and comprising:
   spring brake cylinders (68a, 68b) arranged on wheel brakes of at least one vehicle axle (8);
   a directly or indirectly electronically controllable brake control valve (56, 56'), an electronic brake control unit (48) that controls the brake control valve (56, 56') in a manner that is dependent on the current value of a brake value signal (SBW),
   wherein the brake control valve is a 3/3-way proportional valve with a pressure medium inlet, a pressure medium outlet, and a working connector,
   wherein the working connector is adjustable continuously between a connection to the pressure medium outlet and to the pressure medium inlet,
   wherein the pressure medium inlet is connected via a supply line (52) to a pressure medium source (14),
   wherein the pressure medium outlet is connected to a pressure medium sink (16b), and
   wherein the working connector is connected via a working line (60, 66) to the spring brake cylinders (68a, 68b),
   wherein a controllable check valve (62), which shuts off in the direction of the brake control valve (56, 56'), is arranged in the working line (60)
   wherein brake force of the spring brake cylinder (68a, 68b) is reduced by the brake control valve (56, 56') by way of a feed of pressure medium and
   wherein the brake force of the spring brake cylinder (68a, 68b) is increased by the brake control valve (56, 56') by way of a discharge of pressure medium,
   wherein the controllable check valve (62) is pressure-controlled is unlocked by way of pressurization of a check valve control inlet of the controllable check valve (62), and wherein the controllable check valve (62) is assigned and connected to a pilot valve (72), by way of which the check valve control inlet is selectively connectable to the pressure medium source (14) or to a further pressure medium sink (16c).

7. The secondary brake system (46') as claimed in claim 6, wherein the brake control valve (56') is pressure-controlled via a control inlet, wherein the working connector of said brake control valve (56') is connected to the pressure medium outlet in the case of a pressureless control inlet and is connected in an unthrottled manner to the pressure medium inlet in the case of the control inlet loaded with a maximum actuating pressure, and wherein said brake control valve (56') is assigned a pilot valve (86) that is a proportional valve and by way of which the control inlet of the brake control valve (56') is connected in a graduated manner to the pressure medium source (14) or a further pressure medium sink (16c).

8. The secondary brake system (46') as claimed in claim 7, wherein the pilot valve (86) is a 3/3-way solenoid valve with a pilot valve pressure medium inlet, a pilot valve pressure medium outlet, and a pilot valve control outlet, wherein the pilot valve pressure medium inlet is connected via a connector line (70) to the supply line (52), the pilot valve pressure medium outlet is connected to a pressure medium sink (16c), and the pilot valve control outlet is connected via a control line (88) to the control inlet of the brake control valve (56'), wherein the pilot valve control outlet is connected to the pilot valve pressure medium outlet in the non-energized state and is connected in an unthrottled manner to the pilot valve pressure medium inlet in the maximum energized state, and wherein an electromagnet of the pilot valve (86) is actuated by the brake control unit (48) via an electric control line (90).

9. The secondary brake system (46, 46') as claimed in claim 6, wherein the pilot valve (72) that is assigned and connected to the controllable check valve (62) is a 3/2-way solenoid switching valve with a pilot valve pressure medium inlet, a pilot valve pressure medium outlet and a pilot valve control outlet, wherein the pilot valve pressure medium inlet is connected via a connector line (70) to the supply line (52), the pilot valve pressure medium outlet is connected to the further pressure medium sink (16c), and the pilot valve control outlet is connected to the check valve control inlet, wherein the pilot valve control outlet is connected to the pilot valve pressure medium outlet in the non-energized state and is connected to the pilot valve pressure medium inlet in the energized state, and wherein an electromagnet of said pilot valve (72) is actuated by the brake control unit (48) via an electric control line (74).

10. An electronically controllable secondary brake system (46, 46') of a vehicle (2), the secondary brake system operable as both a parking brake system and an auxiliary brake system, the secondary brake system operated by pressure medium and comprising:
spring brake cylinders (68a, 68b) arranged on wheel brakes of at least one vehicle axle (8);
a directly or indirectly electronically controllable brake control valve (56, 56'), an electronic brake control unit (48) that controls the brake control valve (56, 56') in a manner that is dependent on the current value of a brake value signal (SBW),
wherein the brake control valve is a 3/3-way proportional valve with a pressure medium inlet, a pressure medium outlet, and a working connector,
wherein the working connector is adjustable continuously between a connection to the pressure medium outlet and to the pressure medium inlet,
wherein the pressure medium inlet is connected via a supply line (52) to a pressure medium source (14),
wherein the pressure medium outlet is connected to a pressure medium sink (16b), and
wherein the working connector is connected via a working line (60, 66) to the spring brake cylinders (68a, 68b),
wherein a controllable check valve (62), which shuts off in the direction of the brake control valve (56, 56'), is arranged in the working line (60)
wherein brake force of the spring brake cylinder (68a, 68b) is reduced by the brake control valve (56, 56') by way of a feed of pressure medium and
wherein the brake force of the spring brake cylinder (68a, 68b) is increased by the brake control valve (56, 56') by way of a discharge of pressure medium,
wherein the secondary brake system (46, 46') is either configured as a hydraulic brake system or as a compressed air brake system,
wherein in the hydraulic brake system the pressure medium source (14) has: an oil pump (18), a hydraulic pressure preparation device (20), and a hydraulic pressure accumulator (54), and wherein the pressure medium sink (16, 16a, 16b, 16c, 16d) is configured as at least one hydraulic collecting vessel;
wherein in the compressed air brake system, the pressure medium source has: a compressor, a pneumatic pressure preparation device, and a pneumatic pressure accumulator, and wherein the pressure medium sink comprises at least one ventilation outlet.

11. A method for controlling an electronically controllable secondary brake system (46, 46'), operated by pressure medium, of a vehicle (2), which secondary brake system (46, 46') is usable both as a parking brake system and as an auxiliary brake system, the secondary brake system (46, 46') comprising spring brake cylinders (68a, 68b) arranged on wheel brakes of at least one vehicle axle (8), a directly or indirectly electronically controllable brake control valve (56, 56'), and an electronic brake control unit (48) with a data storage medium (49), the method comprising:
reducing a brake force on the spring brake cylinders (68a, 68b) via a feed of pressure medium by way of the brake control valve (56, 56');
increasing a brake force on the spring brake cylinders (68a, 68b) via a discharge of pressure medium by way of the brake control valve (56, 56');
wherein the electronic brake control unit (48) controls the brake control valve (56, 56') in a manner dependent on a current value of a brake value signal (SBW),
setting a working pressure (pFSB) in the spring brake cylinders (68a, 68b) in a manner dependent on the current value of the brake value signal (SBW) with an actuation of the brake control valve (56, 56') and of a controllable check valve (62) that is arranged downstream of said brake control valve (56, 56') and shuts off in the direction of the brake control valve (56, 56');
lowering the working pressure (pFSB) along with an increasing value of the brake value signal (SBW).

12. The method as claimed in claim 11, wherein the working pressure (pFSB) is set via utilization of characteristic curves (A, B, C) which are valid for different operating types of the secondary brake system (46, 46') and are stored in the data storage medium (49) of the brake control unit (48).

13. The method as claimed in claim 11, wherein the secondary brake system (46, 46') is utilized in an additional brake function, wherein the secondary brake system (46, 46') assists a service brake system (30) of the vehicle (2), the method further comprising:
- braking the vehicle (2) with the secondary brake system (46, 46') when values of the brake value signal (SBW) are present that signal a brake request that is greater than a brake retardation of the vehicle that is manageable solely by the service brake system (30),
- wherein the working pressure (pFSB) of the secondary brake system (46, 46') is lowered along with an increasing value of the brake value signal (SBW), the brake value signal (SBW) increasing from a fixed initial value (SBW_Start) of the brake value signal (SBW), starting from a maximum working pressure (pFSB_max) in the case of a minimum value of the brake value signal (SBW), as far as a predefined working pressure (pFSB) in the case of a maximum value of the brake value signal (SBW).

14. The method as claimed in claim 11, wherein the secondary brake system (46, 46') is utilized in an auxiliary brake function, wherein brake activity of a service brake system (30) of the vehicle (2) is replaced by brake activity of the secondary brake system (46, 46'), the method comprising:
- wherein the working pressure (pFSB) of the secondary brake system (46, 46') is lowered along with an increasing value of the brake value signal (SBW), starting from a maximum working pressure (pFSB_max) in the case of a minimum value of the brake value signal (SBW), as far as a minimum working pressure (pFSB) in the case of a maximum value of the brake value signal (SBW).

15. The method as claimed in claim 11, further comprising: wherein the working pressure (pFSB) of the secondary brake system (46, 46') is lowered in a progressive manner along with an increasing value of the brake value signal (SBW), starting from a maximum working pressure (pFSB_max) in the case of a minimum value of the brake value signal (SBW), as far as a minimum working pressure (pFSB) in the case of a maximum value of the brake value signal (SBW).

16. The method as claimed in claim 11, wherein the secondary brake system (46, 46') is utilized in an emergency brake function, wherein a service brake system (30) of the vehicle (2) is replaced completely by the secondary brake system (46, 46') with regard to its brake function, the method comprising:
- wherein the working pressure (pFSB) of the secondary brake system (46, 46') is lowered along with an increasing value of the brake value signal (SBW), starting from a maximum working pressure (pFSB_max) in the case of a minimum value of the brake value signal (SBW), up to a smallest possible working pressure (pFSB) in the case of a maximum value of the brake value signal (SBW).

17. The method as claimed in claim 16, wherein the working pressure (pFSB) of the secondary brake system (46, 46') is lowered in a linear manner along with the increasing value of the brake value signal (SBW), starting from the maximum working pressure (pFSB_max) in the case of the minimum value of the brake value signal (SBW), as far as the minimum working pressure (pFSB) in the case of a maximum value of the brake value signal (SBW).

18. The method as claimed in claim 11, further comprising wherein the working pressure (pFSB) of the secondary brake system (46, 46') is lowered along with an increasing value of the brake value signal (SBW), starting from a maximum working pressure (pFSB_max) in the case of a minimum value of the brake value signal (SBW), as far as a minimum working pressure (pFSB) in the case of a maximum value of the brake value signal (SBW), wherein the profile of the lowering of the working pressure is at least co-determined in a manner dependent on vehicle type, vehicle model, and/or vehicle overall weight of the vehicle (2).

\* \* \* \* \*